(12) United States Patent
Boyle et al.

(10) Patent No.: US 12,728,296 B2
(45) Date of Patent: Sep. 8, 2026

(54) VENTILATION APPARATUS

(71) Applicant: Aviation Works Limited, London (GB)

(72) Inventors: Rob Boyle, London (GB); Tim Wakeford, London (GB)

(73) Assignee: Aviation Works Limited, London (GB)

( * ) Notice: Subject to any disclaimer, the term of this patent is extended or adjusted under 35 U.S.C. 154(b) by 0 days.

(21) Appl. No.: 18/722,431

(22) PCT Filed: Dec. 21, 2022

(86) PCT No.: PCT/EP2022/087249
§ 371 (c)(1),
(2) Date: Jun. 20, 2024

(87) PCT Pub. No.: WO2023/118304
PCT Pub. Date: Jun. 29, 2023

(65) Prior Publication Data

US 2025/0082970 A1 Mar. 13, 2025

(30) Foreign Application Priority Data

Dec. 21, 2021 (EP) ..................................... 21216658

(51) Int. Cl.
*A62B 7/02* (2006.01)
*A62B 7/14* (2006.01)
(Continued)

(52) U.S. Cl.
CPC .................. *A62B 7/02* (2013.01); *A62B 7/14* (2013.01); *A62B 9/02* (2013.01); *B64D 11/00* (2013.01)

(58) Field of Classification Search
CPC .............. A62B 7/02; A62B 7/14; B64D 11/00
See application file for complete search history.

(56) References Cited

U.S. PATENT DOCUMENTS 4,335,735 A 6/1982 Cramer et al.
10,561,863 B1 2/2020 Dashevsky et al.
(Continued)

FOREIGN PATENT DOCUMENTS

CN 100430852 C 11/2008
GB 1175604 A 12/1969

OTHER PUBLICATIONS

WO 2020016422 A1; Studer Marc [CH], Jansen Gunnar [CH], Wakeford Tim [GB], Boyle Rob [GB]; Jan. 23, 2020.*
(Continued)

*Primary Examiner* — Paul J Gray
(74) *Attorney, Agent, or Firm* — Smith Baluch LLP

(57) ABSTRACT

An apparatus for preparing a ventilation gas mixture, the apparatus comprising: a first gas feed configured to receive carbon dioxide via a first gas valve; a second gas feed configured to receive oxygen via a second gas valve; a gas mixing device configured to receive the carbon dioxide and the oxygen from the first and second gas feeds and combine the carbon dioxide with the oxygen in the gas mixing device to form a ventilation gas mixture; an adjuster configured to adjust the first and second gas valves between an open position and a closed position in order to adjust the relative amounts of carbon dioxide and oxygen forming the ventilation gas mixture; and wherein the adjuster is configured to adjust the first and a second gas valves based on an air pressure applied to the apparatus.

11 Claims, 2 Drawing Sheets

(51) Int. Cl.
*A62B 9/02* (2006.01)
*B64D 11/00* (2006.01)

(56) References Cited

U.S. PATENT DOCUMENTS

2002/0112722 A1 8/2002 Carter
2021/0330996 A1 10/2021 Studer et al.

OTHER PUBLICATIONS

International Search Report and Written Opinion in International App. No. PCT/EP2022/087249 dated Mar. 22, 2023, 11 pages.
Office Action in European App. No. 22840749.0 dated Oct. 17, 2025, 5 pages.

* cited by examiner

Figure 1:
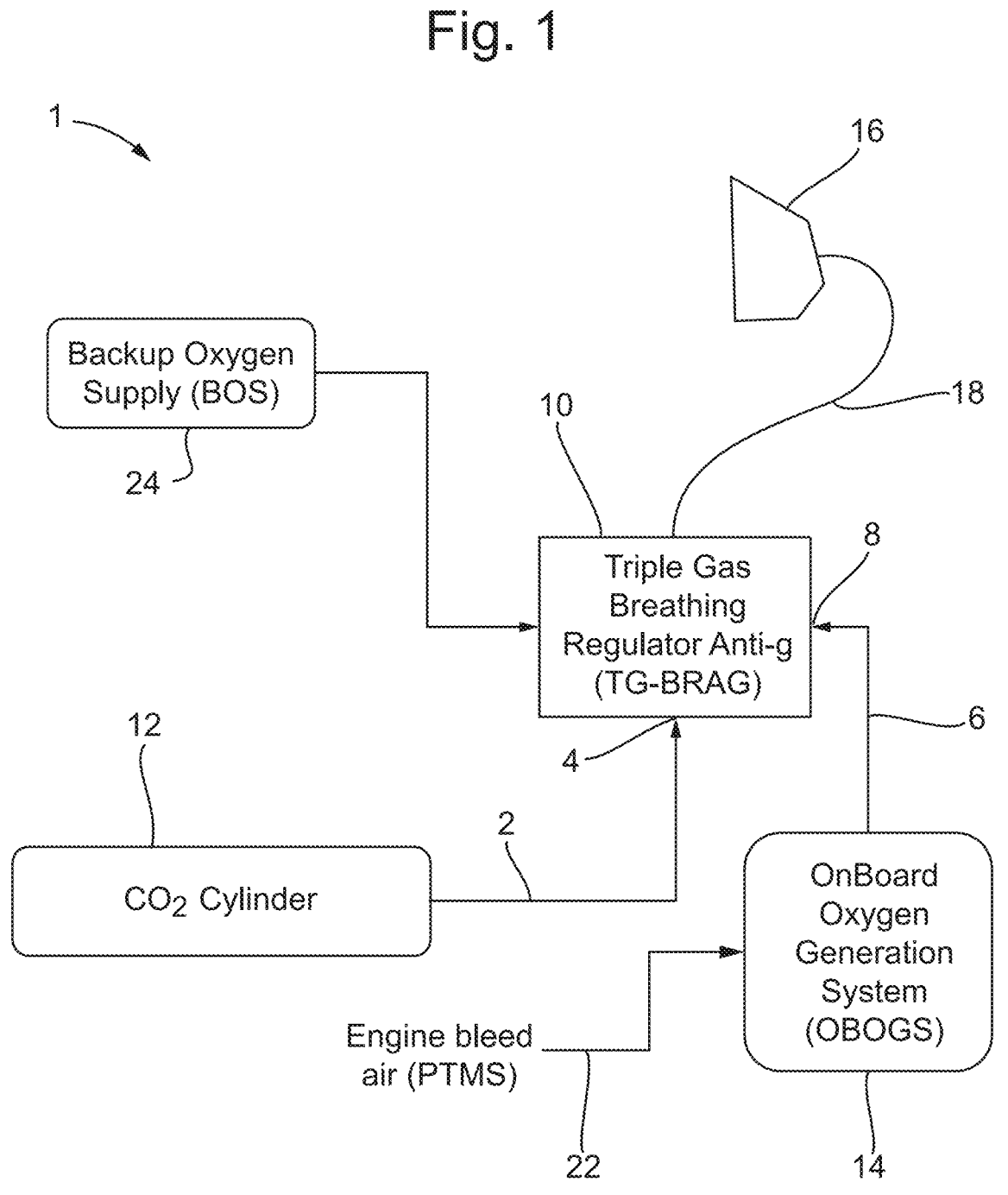

Backup Oxygen Supply (BOS)

24

10

18

Triple Gas Breathing Regulator Anti-g (TG-BRAG)

8

12

4

6

2

$CO_2$ Cylinder

OnBoard Oxygen Generation System (OBOGS)

Engine bleed air (PTMS)

22

14

VENTILATION APPARATUS

CROSS-REFERENCE TO RELATED APPLICATIONS

The present application is a U.S. national stage filing under 35 U.S.C. § 371 of PCT/EP2022/087249, filed on Dec. 21, 2022, which in turn claims priority to European Patent No. 21216658.1, filed on Dec. 21, 2021. These applications are incorporated herein by reference for all purposes in their respective entireties.

FIELD OF THE INVENTION

The present invention relates to an apparatus for preparing a ventilation gas mixture to aircraft pilots and crew members.

BACKGROUND

During normal breathing, atmospheric pressure forces oxygen through the lungs' membrane into the bloodstream. As altitude increases, for example when inside an aircraft, atmospheric pressure decreases and the amount of oxygen forced into the blood also decreases. Whilst the percentage of oxygen in the air doesn't change, the partial pressure of oxygen (the amount of the air pressure in the lungs that is made up of oxygen) has decreased due to the decrease in atmospheric pressure. In order to ensure the same amount of oxygen enters the bloodstream at high altitudes, the partial pressure of oxygen is increased. This can be done by increasing the percentage of oxygen in the air. However, at very high altitudes, for example 40,000 feet and above, there isn't enough pressure in the atmosphere to allow the lungs to absorb safe levels of oxygen, even if 100% oxygen is being breathed. In this case, pressure must be added to the oxygen to force the oxygen through the lungs' membranes called pressure breathing. A pressure breathing system forces pressurized oxygen into the lungs of a user, for example a pilot, when the user breathes and so oxygen is only supplied when a user breathes. The system can provide high concentrations of oxygen, for example between substantially 90%-100% oxygen under positive pressure or a mixture of oxygen diluted with cabin air on a specific, altitude based schedule to maintain a safe oxygen saturation.

Operation of combat aircraft at increased positive normal acceleration causes the crew to experience increased G-force. G-force normally refers to the acceleration experienced when an aircraft is moved aggressively in the pitch axis, whereby the apparent weight of the aircraft occupants is significantly increased. A G-tolerance is the ability of a living subject to be exposed to G-forces without noticeable, or at least severe, consequences. High G-forces are therefore experienced by crew members of combat aircrafts due to increased accelerations and/or narrow flight radii, but may also be experienced in other aircrafts, vehicles, simulators and the like.

During aircraft manoeuvring, combat aircraft are capable of changing pitch very rapidly. This is most often used for fighter aircraft in order to obtain a weapons solution onto the enemy aircraft, but is regularly used on other combat aircraft (e.g. tactical bombers, reconnaissance aircraft, and combat training aircraft), in order to remain below radar detection or to evade enemy fire, or train for those scenarios. The ability to safely achieve a higher G-force, through increased G-tolerance, provides a tactical advantage to a combat aircraft since it can enable faster weapons targeting or evasion from enemy fire.

Exposure to high G-forces causes the blood in a human body to be "pulled" towards the feet, and thus starving the brain of oxygen. As the G-force increases, the effect becomes more pronounced, initially with greying or tunnelling of vision, through the eventual loss of consciousness. Additionally, rapid application of G-force, even to lower levels, can cause sudden loss of consciousness. This loss of consciousness is generally referred to as G-induced Loss of Consciousness (GLOC). When this loss of consciousness happens to a pilot close to the ground, or with the aircraft velocity vector towards the ground, it can have catastrophic outcome.

Furthermore, repeated exposure to even moderate levels of elevated G-forces causes fatigue in aircrew which, over the course of a flight, can result in poor crew judgement or failure to complete mandatory tasks, e.g. missing items on a check list, or failing to notice fuel levels falling below a minimum level. Although clearly more benign than a GLOC event, this fatigue can still lead to catastrophic outcomes, especially when coupled with the complex tasks required to operate modern combat aircraft in busy airspace environments.

To help counter the effect of G-force a user, such as a pilot, may wear a special garment which applies a pressure to the user's body, in particular to their legs and lower torso. This garment squeezes the lower body in order to increase the blood pressure in the upper body, forcing blood up to the brain. However, some adverse effect of increased G-force may still present problems.

It would be advantageous to provide a system which is able to further mitigate the effects of high G-forces on aircraft crew.

SUMMARY OF THE INVENTION

According to a first aspect there is provided an apparatus for preparing a ventilation gas mixture, the apparatus comprising: a first gas feed configured to receive carbon dioxide via a first gas valve; a second gas feed configured to receive oxygen via a second gas valve; a gas mixing device configured to receive the carbon dioxide and the oxygen from the first and second gas feeds and combine the carbon dioxide with the oxygen in the gas mixing device to form a ventilation gas mixture; an adjuster configured to adjust the first and second gas valves between an open position and a closed position in order to adjust the relative amounts of carbon dioxide and oxygen forming the ventilation gas mixture; and wherein the first and a second gas valves are arranged to be adjusted based on an air pressure applied to the apparatus.

Adjusting the first and second gas valves based on the air pressure that is experienced by the apparatus means that the amount of carbon dioxide and oxygen entering the gas mixing device is adjusted based on the altitude of the apparatus. Using the pressure of the air surrounding the apparatus to adjust the gas valves provides an apparatus which responds quickly and efficiently to changes in altitude. This is important because the optimal amounts of carbon dioxide and oxygen present in the ventilation gas mixture change as altitude changes and so it is advantageous to provide an apparatus which can respond to the required changes quickly. This ensures that the ventilation gas mixture is suitable for the altitude being experienced by the apparatus, and thus by a user of the apparatus.

Preferably, the adjuster is configured to adjust the first and a second gas valves based on an air pressure applied to the adjuster. The adjuster may be considered as a component which is sensitive to changes in air pressure. For example, the adjuster may move in response to a change in air pressure, this movement of the adjuster being arranged to cause the adjustment of the first and a second gas valves.

The adjuster may comprise a diaphragm. The diaphragm may be connected to the second gas valve. The second gas valve may be adjusted based on an air pressure applied to the diaphragm. In this case, the diaphragm may be arranged to cause the adjustment of the first and a second gas valves, based on the air pressure and therefore on the altitude of the apparatus.

The movement of the second gas valve can be controlled using the effect of air pressure on the diaphragm, and so movement of the second gas valve is as a result of the altitude experienced by the apparatus. The amount of oxygen is therefore controlled based on the altitude experienced by the apparatus.

In some examples, the diaphragm may be connected to the first gas valve, wherein the first gas valve may be adjusted based on the air pressure applied to the diaphragm. In this case, the diaphragm may be connected to both the first and the second gas valves. This means that the first gas valve may be adjusted based on the position of the first diaphragm, wherein the position of the diaphragm varies depending on the air pressure applied to the diaphragm in a similar manner to the second gas valve.

The adjuster may comprise a first arm connected to the first gas valve and the diaphragm, wherein the first gas valve is adjusted through movement of the first arm, the movement of the first arm based on the air pressure applied to the diaphragm. Thus, changes in air pressure move the diaphragm, which causes the first arm to move, and so the first gas valve is adjusted based on the position of the diaphragm.

The adjuster may comprise a second arm connected to the second gas valve and the diaphragm, wherein the second gas valve is adjusted through movement of the second arm, the movement of the second arm based on the air pressure applied to the diaphragm. Thus, changes in air pressure move the diaphragm, which causes the second arm to move, and so the second gas valve is adjusted based on the position of the diaphragm.

The amount of carbon dioxide and oxygen in the ventilation gas mixture is controlled depending on the size of the air pressure experienced by the apparatus. The amount by which the first and second gas valves are adjusted may be proportional to the size of the air pressure applied to the apparatus.

Preferably the adjuster may be configured to adjust the first and second gas valves towards an open position as the air pressure applied to the apparatus decreases. Also preferably, the adjuster may be configured to adjust the first and second gas valves towards a closed position as the air pressure applied to the apparatus increases. In this way, the amount of oxygen in the gas mixing device is increased as the altitude experienced by the apparatus is increased. This means that the percentage of oxygen provide to the user, is increased as the altitude increases, ensuring the user receives sufficient oxygen for the given altitude condition.

The first gas valve and the second gas valve may be configured to be adjusted substantially simultaneously. Moving the first and second gas valves at substantially the same time, ensures that the relatives proportions of oxygen and carbon dioxide are adjusted together at the same time. In particular, this may ensure that amount of carbon dioxide, and therefore the partial pressure of carbon dioxide, is reduced when the amount of oxygen, and therefore the partial pressure of oxygen, is increased.

The adjuster may be configured to adjust the positions of the first gas valve and the second gas valve in accordance with a pre-defined schedule.

The diaphragm of the adjuster may be connected to each of the first and second gas valves such that movement of the diaphragm is arranged to cause movement of both the first and second gas valves. The diaphragm may be arranged to cause both the first and the second gas valves to move towards the closed position and/or both the first and the second gas valves to move towards the open position.

A portion of the diaphragm may be exposed to the ambient air, and movement of the diaphragm may be dependent on the pressure of the ambient air.

An adjustment of the second gas valve may be arranged to cause an adjustment of the first gas valve. This may provide a simple apparatus which is able to adjust both the first and second gas valves based on the air pressure experienced by the apparatus. In this case, both the first and second gas valves may be controlled by a single mechanism wherein the mechanism adjusts the second gas valve and adjusts the first gas valve. In particular, an adjustment of the second gas valve may be arranged to directly cause an adjustment of the first gas valve. Thus, both the first and second gas valves may be controlled by a single mechanism wherein the mechanism directly adjusts the second gas valve and directly adjusts the first gas valve.

Preferably an adjustment of the second gas valve may be arranged to cause a change in a force applied to the first gas valve such that the first gas valve may be adjusted based on the change in force applied to first gas valve. The change in force may be a positive change or the change in force may be a negative change. The change in force may cause the first gas valve to at least partially open or the change in force may cause the first gas valve to at least partially close. The amount by which the first gas valve is adjusted may be proportional to the size of the change in the force.

The change in force may be a change in pressure applied to the first gas valve such that the first gas valve may be adjusted based on a change in pressure applied to the first gas valve. If the change in pressure is positive, the size of the force applied to the first gas valve may increase. If the change in pressure is negative, the size of the force applied to the first gas valve may decrease. In this way, the first gas valve may be adjusted based on a change in condition within the apparatus.

In some examples, an adjustment of the second gas valve towards an open position may be arranged to cause an adjustment of the first gas valve towards an open position. This means that as the amount of oxygen in the gas mixing device increases, the amount of carbon dioxide in the gas mixing device is maintained and in some cases may increase, as altitude increases. If the amount of oxygen at high altitude becomes too high, the relative amount of carbon dioxide may become too small such that any beneficial effects from adding carbon dioxide to the ventilation gas mixture are no longer felt. Thus, in this case, carbon dioxide is allowed to flow into the gas mixing device, in small amounts, to ensure that the amount of carbon dioxide and thus the partial pressure of carbon dioxide remains constant, allowing the user to benefit from the effect of supplementing oxygen with carbon dioxide.

The first and a second gas valves may be arranged to be adjusted electronically by the adjuster based on an air pressure that is determined by an air pressure sensor and that is in communication with the adjuster. The sensor may form part of an electrical control system which may send signals to a controller which electrically adjusts the first and second gas valves based on the received signals. In some examples the apparatus may comprise an altitude sensor which may determine the altitude of the apparatus. The altitude sensor may form part of an electrical control system which may send signals to a controller which electrically adjusts the first and second gas valves based on the received altitude signals. In some cases, the altitude sensor may form part of the existing aircraft avionics and they may be distinct (separate) from the apparatus.

It should be noted that reference to "first" and "second" are for identifying each of two similar components. The terms "first" and "second" are not intended to imply an order or a preference. Thus, a "first" component may also be a "second" component and vice versa.

According to another aspect there is provided an aircraft comprising the apparatus as described above.

According to another aspect there is provided a method of adjusting first and second gas valves in an apparatus, wherein the apparatus comprises a gas mixing device, the method comprising the steps of: receiving, in a gas mixing device, carbon dioxide from a first gas feed via a first gas valve; receiving, in the gas mixing device, oxygen from a second gas feed via a second gas valve; combining, in the gas mixing device, the carbon dioxide with the oxygen to form a ventilation gas mixture; adjusting, by an adjuster, the first and second gas valves between an open position and a closed position in order to adjust the relative amounts of carbon dioxide and oxygen forming the ventilation gas mixture; wherein adjusting the first and a second gas valves is based on an air pressure that is applied to the apparatus.

BRIEF DESCRIPTION OF THE DRAWINGS

Embodiments of the present invention will now be described by way of example only with reference to the accompanying drawings in which:

FIG. 1 shows a schematic view of an apparatus for preparing a ventilation gas mixture.

DETAILED DESCRIPTION

Figure 2:
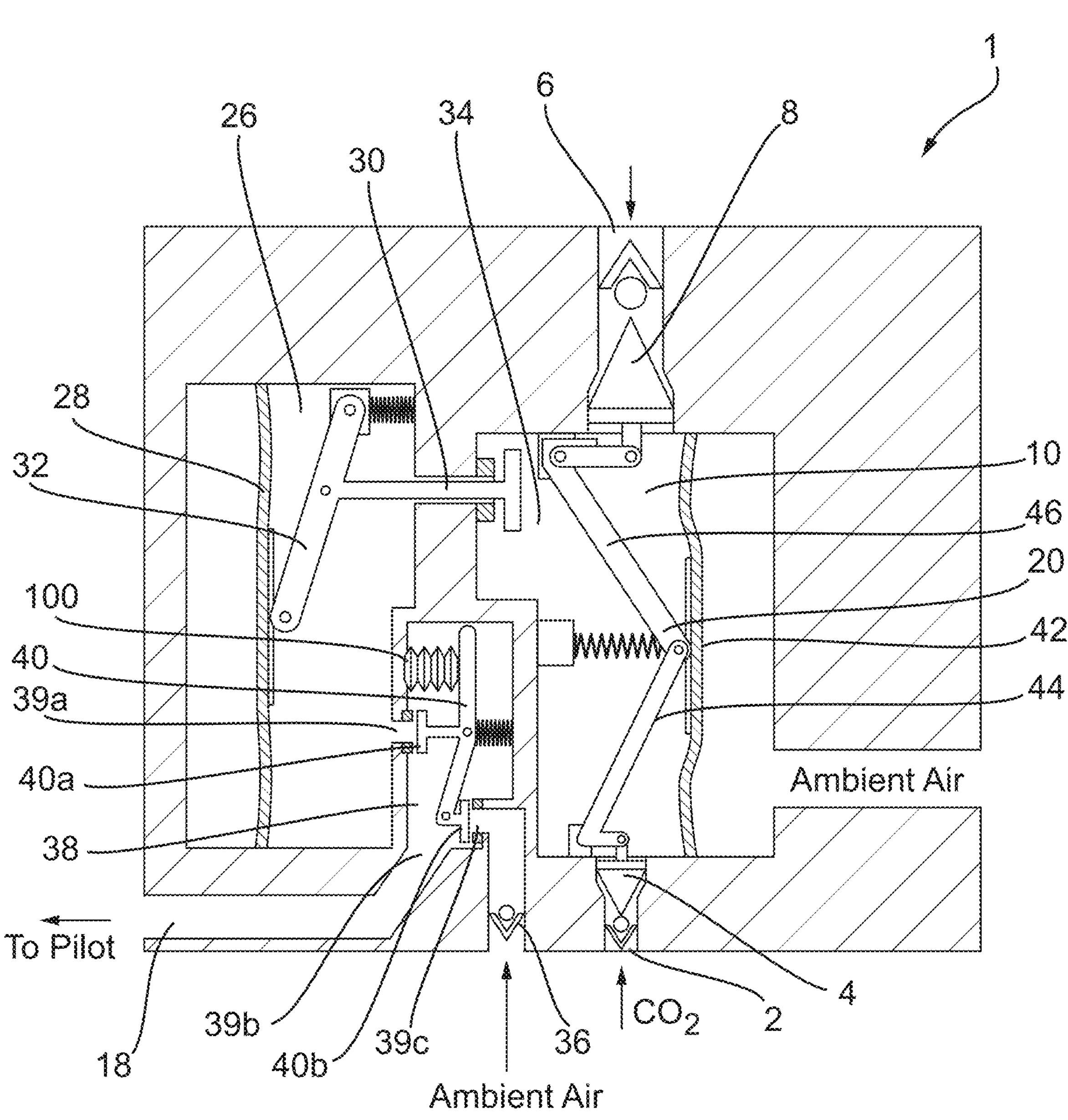
FIG. 2 is a cross-sectional view of part of an apparatus for preparing a ventilation gas mixture.

It has been found that there are significant benefits in terms of blood oxygenation, from introducing relatively small percentages of carbon dioxide into the ambient air at high altitude which effectively lowers the apparent altitude of the ambient air. Thus, to increase blood oxygenation small percentages of carbon dioxide can be introduced into the air breathed by the user.

Introducing a low volume of carbon dioxide to the ventilation air mix significantly improves a user's brain blood oxygen levels compared to breathing normal air. As a result, the G-tolerance of the user may be influenced by the amount of carbon dioxide supplied to the user. Adding a small percentage of carbon dioxide to breathing air allows a user to be exposed to higher accelerations, i.e. tolerance to G-forces increases, as well as reducing fatigue during G-force exposure.

The present description relates to systems and apparatuses used to provide a ventilating gas mixture comprising small amounts of carbon dioxide to a user, in order to enhance the G-tolerance of the user. In particular, relatively small quantities of carbon dioxide are added to the ventilation air, in order to allow the human body to better absorb and utilise oxygen, prioritising oxygenation of the brain, and mitigate the effects of G-forces and hypocapnia.

FIG. 1 illustrates an example apparatus 1 for preparing a ventilation gas mixture. The apparatus 1 comprises a first gas feed 2 configured to receive carbon dioxide via a first gas valve 4, a second gas feed 6 configured to receive oxygen via a second gas valve 8, and a gas mixing device 10 configured to receive the carbon dioxide and the oxygen from the first and second gas feeds and combine the carbon dioxide with the oxygen in the gas mixing device 10 to form a ventilation gas mixture.

The first gas feed 2 is connected to a first gas reservoir 12, which takes the form of a carbon dioxide source, in this case a pressurised cylinder. The second gas feed 6 is connected to a second gas reservoir 14, which in this example takes the form of an on-board oxygen generation system (OBOGS). In other examples, the second gas reservoir 14 may take the form of a Molecular Sieve Oxygen Concentration Systems (MSOCS) or bottles of liquid or gaseous oxygen. The first and second gas reservoirs 12, 14 supply the carbon dioxide and oxygen to the gas mixing device 10. The apparatus 1 is connected to a ventilation mask 16 which receives the ventilation gas mixture from the gas mixing device via a third gas feed 18.

As shown in FIG. 1, the ventilation mask 16, first and second gas reservoirs 12, 14, and the gas mixing device 10 are fluidly connected to each other via the various gas feeds. In this context, the term gas also refers to gas mixtures or also gases or gas mixtures as a product of chemical reaction.

The apparatus 1 also comprises an adjuster 20, shown in FIG. 2, configured to adjust the positions of the first gas valve 4 and the second gas valve 8 in order to adjust the relative amounts of carbon dioxide and oxygen that are received in the gas mixing device 10 and form the ventilation gas mixture.

The first and second gas reservoirs 12, 14 store their respective gases under pressure, and so both the carbon dioxide and the oxygen enter the first and second gas feeds 2, 6 under pressure. Movement of each of the first and second gas valves 4, 8 adjusts the size of the opening between each gas feed 2, 6 and the gas mixing device 10, which in turn changes the pressure of the gas mixture within the gas mixing device 10. For example, when the gas valves 4, 8 are towards a closed position the size of the opening between the gas feed 2, 6 and the gas mixing device 10 is small. A limited amount of gas is therefore able to flow through the small opening and so the pressure in the gas mixing device 10 is low. Conversely, when the gas valves 4, 8 are towards an open position the size of the opening between the gas feed 2, 6 and the gas mixing device 10 is large. A large amount of gas is therefore able to flow through the bigger opening and so the pressure in the gas mixing device 10 increases.

The adjuster 20 can be thought of as a regulator because it regulates the relative proportions of carbon dioxide and oxygen in the ventilation gas mixture.

Generally, during operation, a user initially inhales the air from the gas mixing device 10 through the ventilation mask 16 which supplies the ventilation gas mixture to the user. The ventilation gas mixture generally comprises a mixture carbon dioxide and oxygen the relative amounts of each gas dependent on the altitude. As the altitude of the aircraft increase, the proportion of oxygen in the ventilation gas mixture increases until a point is reached where substantially 100% oxygen is supplied to the user (minus the desired carbon dioxide percentage). As discussed, pressure breathing is often used in aircraft to increase the partial pressure of oxygen. The ventilation gas mixture supplied to the ventilation mask 16 from the gas mixing device 10 and inhaled by the user is therefore supplied under pressure during periods of pressure breathing.

The apparatus 1 generally include a number of non-return valves along each gas feed and at a general level, the apparatus is designed to ensure that the pressure of the gas leaving the gas mixing device 10 is substantially matched to the ambient air pressure. The ambient air pressure will continually fluctuate as the aircraft manoeuvres and the apparatus corrects for these fluctuations using the adjuster 20. That is, in general terms, the pressurisation and depressurisation of the gas mixing device 10 is controlled by the aircraft depending upon the air pressure exerted on the apparatus. By air pressure (or ambient air pressure), we are referring to the air pressure of the general surroundings outside of the apparatus, for example the cabin air pressure. As low air pressure is experienced (at high altitudes), the oxygen and carbon dioxide flows are increased within the mixing device 10.

Further details of the apparatus 1 and its operation will now be described.

The second gas reservoir 14, which acts as a source of oxygen, produces and supplies a high concentration of oxygen, for example 90%-100% and preferably near 100% oxygen, under pressure to the second gas feed 6, in this case from a conditioned engine bleed supply 22 by means of the principle of Pressure Swing Adsorption (PSA). An optional backup oxygen supply (BOS) 24 may be included which comprises at least one high pressure oxygen cylinder for providing backup oxygen for example in the event of loss of oxygen supply from the oxygen supply or during an ejection event.

Ventilation gas is delivered to a user only as the user inhales, or on demand. In this way the apparatus 1 may be considered as part of a demand-flow system. When the user holds their breath or exhales, the supply of ventilation gas is stopped. This helps reduce oxygen and carbon dioxide wastage, prolonging the duration of the oxygen and carbon dioxide supplies. The apparatus 1 may be adapted for use with more with one user. In this case, the third gas feed 18 may comprise one or more non-return valves, and a plurality of ventilation masks would be provided, each in communication with the third gas feed 18.

With reference to FIG. 2, the apparatus comprises a series of chambers through which the gases flow before reaching the user. A first chamber 26 comprises a first diaphragm 28 connected to a demand valve 30 via a moveable arm 32. Movement of the first diaphragm 28 therefore causes movement of the demand valve 30 between an open and closed position. When a user inhales through the ventilation mask 16 the pressure within the first chamber 26 is reduced causing the first diaphragm 28 to move in a first direction which subsequently opens the demand valve 30.

Oxygen from the second gas feed 6 and carbon dioxide from the first gas feed 2 flow into a second chamber 34 via the first and second gas valves 4, 8. The oxygen and carbon dioxide gases are mixed in the second chamber 34, and so the second chamber 34 forms part of the gas mixing device 10. The pressure of the oxygen and the carbon dioxide from the first and second gas feeds 2, 6 is adjusted by the adjuster 20 and then the oxygen and carbon dioxide gas mixture passes into the first chamber 26 and to the ventilation mask 16. The pressure of the gas mixture in the second chamber 34 is substantially equalized with the ambient pressure by the adjuster 20 to ensure that the user is not breathing the ventilation gas mixture under pressure. However, in some cases pressure breathing is desirable as mentioned elsewhere, for example at extreme altitude.

In order to balance the pressure of the gases, the adjuster 20 comprises a second diaphragm 42 which is connected to both the first and second gas valves 4, 8 through a series suitable arms 44, 46. Movement of the second diaphragm 42 causes movement of the first and second gas valves 4, 8, and so in this way movement of the second diaphragm 42 can be used to adjust the flow of carbon dioxide and oxygen into the gas mixing device 10.

When the first and second gas valves 4, 8 are open, large amounts of carbon dioxide and oxygen can flow into the second chamber 34. This increases the pressure inside the second gas chamber 34. This increased pressure exerts a force on the second diaphragm 42 causing the second diaphragm 42 to move. As can be seen in FIG. 2, one side of the second diaphragm 42 is exposed to the ambient air. The second diaphragm 42 moves to substantially balance the pressure experienced by either side of the second diaphragm 42. Thus, when the pressure inside the second chamber 34 is greater than the pressure of the ambient air, the second diaphragm 42 moves to increase the volume of the second camber 34 thus reducing the pressure. Since the second diaphragm 42 is connected to both the first and the second gas valves 4, 8, when the second diaphragm 42 moves to increase the size of the second chamber 34, the first and second valves are 4, 8 moved towards a closed position and so less gas can enter the second gas chamber 34. When less gas enters the second gas chamber 34 the pressure stops increasing. If the pressure in the second gas chamber 34 becomes lower than the ambient air pressure, the force of the ambient air pressure moves the second diaphragm 42 to reduce the size of the second chamber 34, which has the effect of opening the first and second gas valves 4, 8. This means more gas can flow into the second gas chamber 34 and balance the ambient air pressure.

When the user exhales, the pressure within the first chamber 26 is increased causing the first diaphragm 28 to move in a second direction which subsequently closes the demand valve 30 and stops the flow of the ventilation gas mixture. In addition a biasing means, for example a spring, connected to the moveable arm 32 may also act on the moveable arm 32 to cause the demand valve 30 to close. In this case, oxygen and carbon dioxide flowing into the second gas chamber 34 may collect in the second gas chamber 34. Exhaled air escapes through ports in the ventilation mask 16.

The apparatus 1 dilutes the ventilation gas mixture of oxygen and carbon dioxide with ambient air each time a breath is drawn, the amount of dilution depending on the cabin altitude. This may help reduce the percentage of oxygen and carbon dioxide to the correct levels for the ventilation gas mixture.

Ambient air enters the apparatus 1 via an intake valve and flows into an ambient air chamber 38. The ambient air chamber 38 is located between the first chamber 26 and the third gas feed 18 to the ventilation mask 16. The ambient air chamber comprises a series of openings 39*a*, 39*b*, 39*c* through which various gases flow into and out of the ambient air chamber 38. The size of opening 39*a* between the ambient air chamber 39 and the first chamber 26 and the size of opening 39*c* between the intake valve 26 and the ambient air chamber 38 are controlled by a metering mechanism 40 comprising two metering valves 40*a*, 40*b*.

As altitude increases, the metering mechanism 40 allows more oxygen to flow into the ambient air chamber 38 via the metering valve 40*a* which opens the corresponding opening

39*a*, and less ambient air to flow into the ambient air chamber 38 via the other metering valve 40*b* which closes the corresponding opening 39*c*. The metering mechanism 40 adjusts the flow of gases through the metering valve 40*a*, 40*b* according to predefined characteristics of a barometric capsule 100, which changes shape as the ambient pressure changes. However, in some cases, a computer controlled schedule may be used instead of a barometric capsule.

The gas mixing device 10 receives a high concentration of oxygen, for example 80%-100% oxygen, from the second gas reservoir 14, such as an OBOGS, and the added carbon dioxide displaces the oxygen. However, it is important to preserve the partial pressure of oxygen and ensure that the partial pressure of oxygen is not reduced by the addition of the carbon dioxide, especially at altitude.

The invention claimed is:

1. An apparatus for preparing a ventilation gas mixture, the apparatus comprising:

a first gas feed configured to receive carbon dioxide via a first gas valve;

a second gas feed configured to receive oxygen via a second gas valve;

a gas mixing device configured to receive the carbon dioxide and the oxygen from the first and second gas feeds and combine the carbon dioxide with the oxygen in the gas mixing device to form a ventilation gas mixture;

an adjuster configured to adjust the first and second gas valves between an open position and a closed position in order to adjust the relative amounts of carbon dioxide and oxygen forming the ventilation gas mixture; and wherein the adjuster is configured to adjust the first and second gas valves based on an air pressure applied to the apparatus, wherein the adjuster comprises a diaphragm connected to the first gas valve, and wherein the first gas valve is adjusted based on the air pressure applied to the diaphragm.

2. The apparatus of claim 1 wherein the adjuster is configured to adjust the first and second gas valves based on an air pressure applied to the adjuster.

3. The apparatus of claim 1 wherein the adjuster is further connected to the second gas valve, wherein the second gas valve is adjusted based on an air pressure applied to the diaphragm.

4. The apparatus of claim 3 wherein the adjuster comprises a first arm connected to the first gas valve and the diaphragm, wherein the first gas valve is adjusted through movement of the first arm, the movement of the first arm based on the air pressure applied to the diaphragm.

5. The apparatus of claim 4 wherein the adjuster further comprises a second arm connected to the second gas valve and the diaphragm, wherein the second gas valve is adjusted through movement of the second arm, the movement of the second arm based on the air pressure applied to the diaphragm.

6. The apparatus of claim 1 wherein the adjuster is configured to adjust the first and second gas valves towards an open position as the air pressure applied to the apparatus decreases.

7. The apparatus of claim 1 wherein the adjuster is configured to adjust the first and second gas valves towards a closed position as the air pressure applied to the apparatus increases.

8. The apparatus of claim 1 where the first and second gas valves are configured to move simultaneously.

9. The apparatus of claim 1 wherein the first and second gas valves are arranged to be adjusted electronically by the adjuster based on an air pressure that is determined by an air pressure sensor and in communication with the adjuster.

10. An aircraft comprising the apparatus according to claim 1.

11. A method of adjusting first and second gas valves in an apparatus, wherein the apparatus comprises a gas mixing device, the method comprising the steps of:

receiving, in a gas mixing device, carbon dioxide from a first gas feed via the first gas valve;

receiving, in the gas mixing device, oxygen from a second gas feed via the second gas valve;

combining, in the gas mixing device, the carbon dioxide with the oxygen to form a ventilation gas mixture; and adjusting, by an adjuster, the first and second gas valves between an open position and a closed position in order to adjust the relative amounts of carbon dioxide and oxygen forming the ventilation gas mixture;

wherein adjusting the first and second gas valves is based on an air pressure that is applied to the apparatus, wherein the adjuster comprises a diaphragm connected to the first gas valve, and wherein adjusting the first gas valve comprises adjusting the first gas valve based on the air pressure applied to the diaphragm.

* * * * *